(12) United States Patent
Van Benthem

(10) Patent No.: US 10,769,839 B2
(45) Date of Patent: Sep. 8, 2020

(54) EDGE TEST AND DEPTH CALCULATION IN GRAPHICS PROCESSING HARDWARE

(71) Applicant: Imagination Technologies Limited, Kings Langley (GB)

(72) Inventor: Casper Van Benthem, Abbots Langley (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 16/702,457

(22) Filed: Dec. 3, 2019

(65) Prior Publication Data

US 2020/0105045 A1   Apr. 2, 2020

Related U.S. Application Data

(63) Continuation of application No. 15/981,102, filed on May 16, 2018, now Pat. No. 10,521,950.

(30) Foreign Application Priority Data

Apr. 5, 2018  (GB) .................................... 1805608.5

(51) Int. Cl.
G06T 15/00 (2011.01)
G06T 17/20 (2006.01)

(52) U.S. Cl.
CPC ............ G06T 15/005 (2013.01); G06T 17/20 (2013.01); G06T 2210/36 (2013.01)

(58) Field of Classification Search
None
See application file for complete search history.

(56) References Cited

U.S. PATENT DOCUMENTS 5,949,428 A * 9/1999 Toelle ................... G06T 11/001
                                                              345/589
6,489,966 B1 * 12/2002 Kanzaki ................. G06T 11/40
                                                              345/613

(Continued)

OTHER PUBLICATIONS

Extended European Search Report dated Jan. 15, 2020 in European Application No. 19167185.8.

Primary Examiner — Martin Mushambo
(74) Attorney, Agent, or Firm — Potomac Law Group, PLLC; Vincent M DeLuca

(57) ABSTRACT

A graphics processing hardware pipeline is arranged to perform an edge test or a depth calculation. Each hardware arrangement includes a microtile component hardware element, multiple pixel component hardware elements, one or more subsample component hardware elements and a final addition and comparison unit. The microtile component hardware element calculates a first output using a sum-of-products and coordinates of a microtile within a tile in the rendering space. Each pixel component hardware element calculates a different second output using the sum-of-products and coordinates for different pixels defined relative to an origin of the microtile. The subsample component hardware element calculates a third output using the sum-of-products and coordinates for a subsample position defined relative to an origin of a pixel. The adders sum different combinations of the first output, a second output and a third output to generate output results for different subsample positions defined relative to the origin of the tile.

15 Claims, 8 Drawing Sheets

(56) References Cited

U.S. PATENT DOCUMENTS

| | | | | |
|---|---|---|---|---|
| 8,836,824 B2* | 9/2014 | Baqai | ............... | H04N 5/21 |
| | | | | 348/241 |
| 9,906,981 B2* | 2/2018 | Jha | ............... | H04W 28/06 |
| 9,967,482 B2* | 5/2018 | Tajima | ............... | H04N 5/361 |
| 10,019,820 B2* | 7/2018 | Sorgard | ............... | G06T 17/10 |
| 10,453,170 B2* | 10/2019 | Toth | ............... | G06T 1/60 |
| 2004/0174567 A1* | 9/2004 | Abe | ............... | G06K 9/00456 |
| | | | | 358/2.1 |
| 2011/0052091 A1* | 3/2011 | Zimmer | ............... | G06T 5/002 |
| | | | | 382/260 |
| 2018/0197271 A1* | 7/2018 | Broadhurst | ............... | G06T 15/005 |

* cited by examiner

FIG. 3A
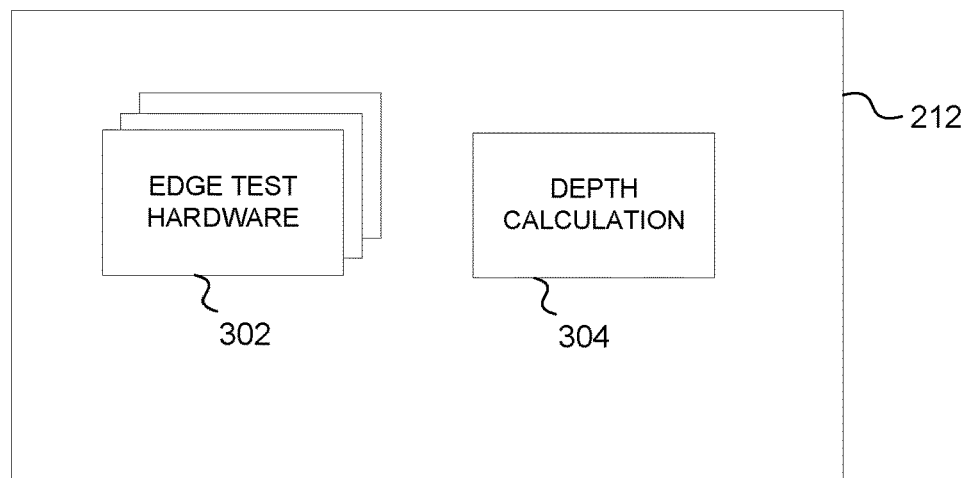
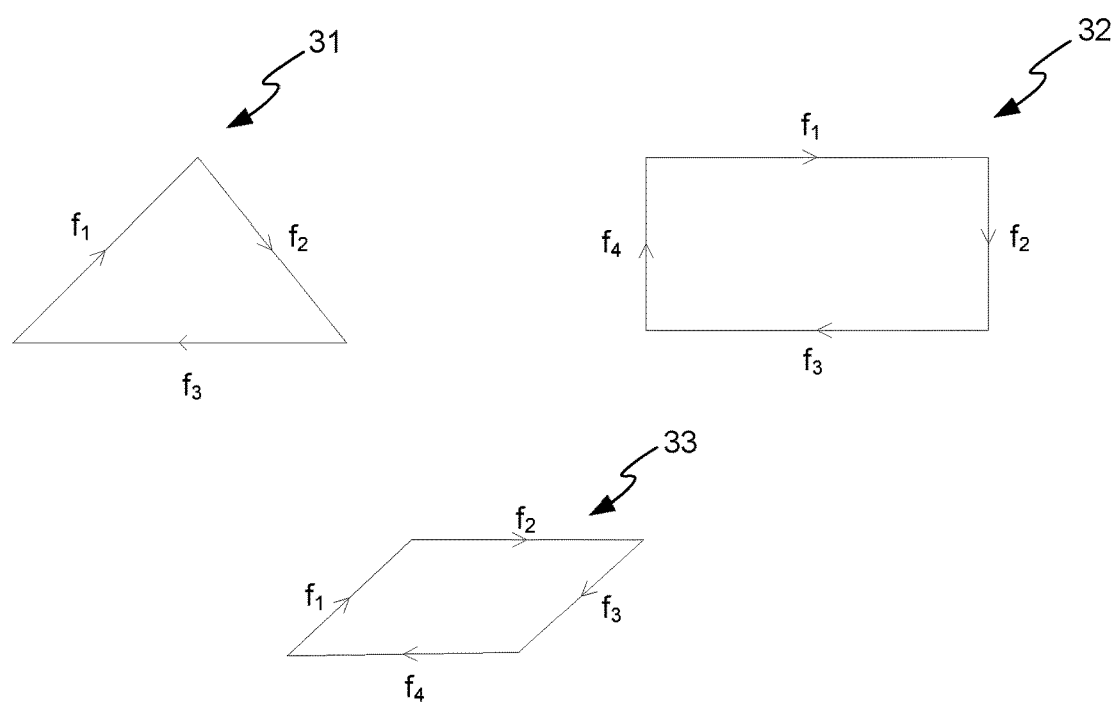
FIG. 3B

EDGE TEST AND DEPTH CALCULATION IN GRAPHICS PROCESSING HARDWARE

CROSS-REFERENCE TO RELATED APPLICATIONS AND CLAIM OF PRIORITY

This application is a continuation under 35 U.S.C. 120 of copending U.S. application Ser. No. 15/981,102 filed May 16, 2018, which claims foreign priority under 35 U.S.C. 119 from United Kingdom Application No. 1805608.5 filed Apr. 5, 2018.

BACKGROUND

Tessellation is a technique used in computer graphics to divide up a set of surfaces representing objects in a scene into a number of smaller and simpler pieces, (referred to as primitives), typically triangles, which are more amenable to rendering. The resulting tessellated surface is generally an approximation to the original surface, but the accuracy of this approximation can be improved by increasing the number of generated primitives, which in turn usually results in the primitives being smaller. The amount of tessellation/subdivision is usually determined by a level of detail (LOD). An increased number of primitives is therefore typically used where a higher level of detail is required, e.g. because an object is closer to the viewer and/or the object has a more intricate shape. However, use of larger numbers of triangles increases the processing effort required to render the scene and hence increases the size of the hardware that performs the processing. Furthermore, as the average triangle size reduces, aliasing (e.g. when angled lines appear jagged) occurs more often and hence graphics processing systems employ anti-aliasing techniques which often involve taking several samples per pixel and subsequently filtering the data.

As the number of primitives that are generated increases, the ability of a graphics processing system to process the primitives becomes more important. One known way of improving the efficiency of a graphics processing system is to render an image in a tile-based manner. In this way, the rendering space into which primitives are to be rendered is divided into a plurality of tiles, which can then be rendered independently from each other. A tile-based graphics system includes a tiling unit to tile the primitives, i.e. to determine, for a primitive, which of the tiles of a rendering space the primitive is in. Then, when a rendering unit renders the tile, it can be given information (e.g. a per-tile list) indicating which primitives should be used to render the tile.

An alternative to tile-based rendering is immediate-mode rendering. In such systems there is no tiling unit generating per-tile lists and each primitive appears to be rendered immediately; however, even in such systems, the rendering space may still be divided into tiles of pixels and rendering of each primitive may still be done on a tile by tile basis with each pixel in a tile being processed before progressing to the next tile. This is done to improve locality of memory references.

The embodiments described below are provided by way of example only and are not limiting of implementations which solve any or all of the disadvantages of known graphics processing pipelines.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A graphics processing pipeline is described which comprises edge test and/or depth calculation hardware. The edge test and/or depth calculation hardware comprises one or more hardware arrangements arranged to perform an edge test or a depth calculation using a sum-of-products. Each hardware arrangement comprises a microtile component hardware element, a plurality of pixel component hardware elements, one or more subsample component hardware elements and a final addition and comparison unit. The microtile component hardware element comprises hardware logic arranged to calculate a first output using the sum-of-products and coordinates of a microtile within a tile in the rendering space. Each pixel component hardware element comprises hardware logic arranged to calculate one of a plurality of second outputs using the sum-of-products and coordinates for different pixels defined relative to an origin of the microtile. Each subsample component hardware elements comprises hardware logic arranged to calculate one a plurality of third outputs using the sum-of-products and coordinates for different subsample positions defined relative to an origin of a pixel. The plurality of adders sum different combinations of the first output, one of the plurality of second outputs and one of the plurality of third outputs to generate a plurality of output results for different subsample positions defined relative to the origin of the tile.

A first aspect provides a graphics processing pipeline arranged to render in a rendering space, wherein the rendering space is sub-divided into a plurality of tiles, each tile is sub-divided into a plurality of microtiles, each microtile comprising an identical arrangement of pixels and each pixel comprising an arrangement of one or more subsample positions, the graphics processing pipeline comprising edge test and/or depth calculation hardware and wherein the edge test and/or depth calculation hardware comprises one or more hardware arrangements each arranged to perform an edge test or a depth calculation using a sum-of-products, each hardware arrangement comprising: a microtile component hardware element comprising hardware logic arranged to calculate a first output using the sum-of-products and coordinates of a microtile within a tile in the rendering space; a plurality of pixel component hardware elements, each comprising hardware logic arranged to calculate one of a plurality of second outputs using the sum-of-products and coordinates for different pixels defined relative to an origin of the microtile; one or more subsample component hardware elements, each comprising hardware logic arranged to calculate a third output using the sum-of-products and coordinates for a subsample position defined relative to an origin of a pixel; a plurality of adders arranged to generate a plurality of output results for the sum-of-products in parallel by combining, for each output result, a different combination of the first output, one of the plurality of second outputs and a third output.

A second aspect provides a method of calculating an edge test output value or a depth calculation value in a graphics processing pipeline arranged to render in a rendering space, wherein the rendering space is sub-divided into a plurality of tiles, each tile is sub-divided into a plurality of microtiles, each microtile comprising an identical arrangement of pixels and each pixel comprising one or more subsample positions, the method comprising: in a first hardware element, calculating a first output based on coordinates of a microtile within a tile; in each of a plurality of second hardware elements, calculating a second output based on coordinates of a pixel within a microtile; in each of one or more third hardware elements, calculating a third output based on coordinates of a subsample within a pixel; and combining a first output with a second output and a third output to generate an edge test output value or a depth calculation value.

Further aspects provide a graphics processing pipeline configured to perform the method as described herein, the graphics processing pipeline embodied in hardware on an integrated circuit; computer readable code (which may be stored on a computer readable storage medium) configured to cause the method as described herein to be performed when the code is run, a method of manufacturing, using an integrated circuit manufacturing system, a graphics processing pipeline as described herein and an integrated circuit manufacturing system configured to manufacture a graphics processing pipeline as described herein.

The graphics processing pipeline comprising edge test and/or depth calculation hardware may be embodied in hardware on an integrated circuit. There may be provided a method of manufacturing, at an integrated circuit manufacturing system, a graphics processing pipeline comprising edge test and/or depth calculation hardware. There may be provided an integrated circuit definition dataset that, when processed in an integrated circuit manufacturing system, configures the system to manufacture a graphics processing pipeline comprising edge test and/or depth calculation hardware. There may be provided a non-transitory computer readable storage medium having stored thereon a computer readable description of an integrated circuit that, when processed, causes a layout processing system to generate a circuit layout description used in an integrated circuit manufacturing system to manufacture a graphics processing pipeline comprising edge test and/or depth calculation hardware.

There may be provided an integrated circuit manufacturing system comprising: a non-transitory computer readable storage medium having stored thereon a computer readable integrated circuit description that describes the graphics processing pipeline comprising edge test and/or depth calculation hardware; a layout processing system configured to process the integrated circuit description so as to generate a circuit layout description of an integrated circuit embodying the graphics processing pipeline comprising edge test and/or depth calculation hardware; and an integrated circuit generation system configured to manufacture the graphics processing pipeline comprising edge test and/or depth calculation hardware according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 3A is a schematic diagram showing the edge test and/or depth calculation hardware from the pipeline of FIG. 2 in more detail;

FIG. 3B is a schematic diagram showing the edge vectors for various primitives;

Figure 1:
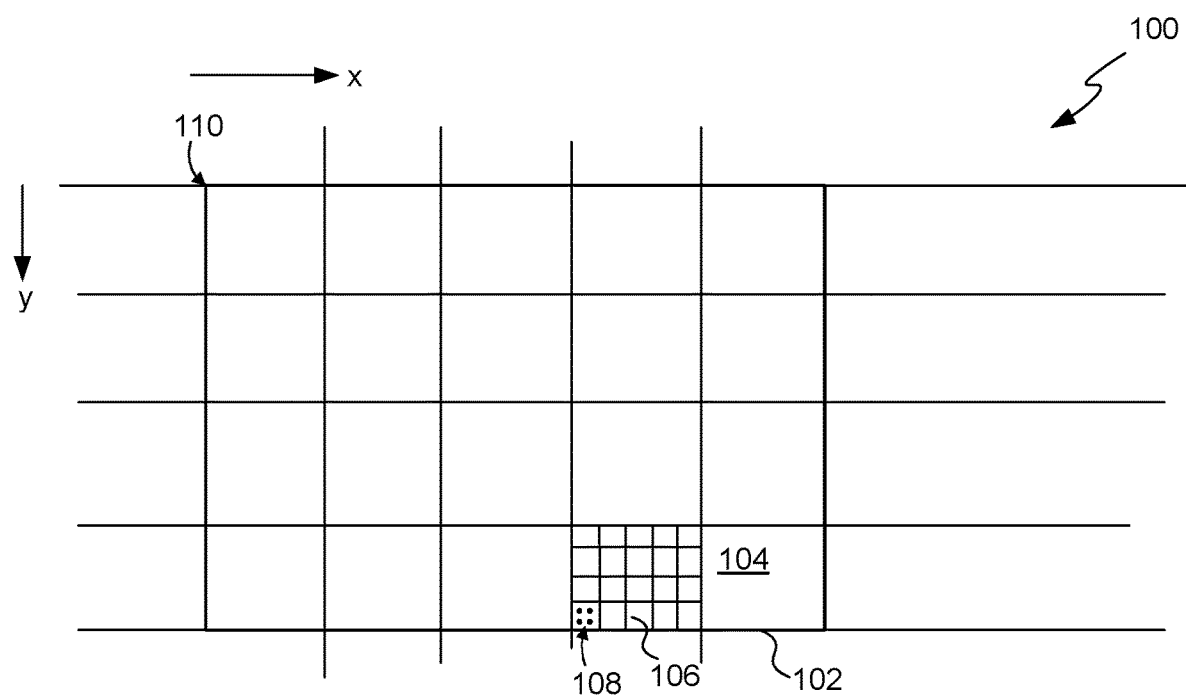
FIG. 1 is a schematic diagram of the rendering space divided into tiles and microtiles.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Described herein is improved edge processing and/or depth calculation hardware. Whilst some of the examples described below relate to hardware that performs both edge processing and depth calculation, this is by way of example only. In other examples, the hardware may perform edge processing only (and hence does not perform depth calculation) and in further examples, the hardware may perform depth calculation only (and hence does not perform edge processing). This hardware may be implemented within the rasterization phase of a graphics processing pipeline (e.g. within a graphics processing unit, GPU). This improved hardware uses a scalable approach to performing both the edge processing and depth calculations and enables large numbers of results (e.g. 64 results for each of edge processing and depth calculation) to be generated in parallel, whilst reducing the physical size (e.g. area) and power consumption of the hardware compared to known hardware. In various examples, a six times reduction in area (e.g. of the hardware implemented in silicon) may be achieved.

The hardware described herein relies on the regular sub-division of the rendering space, as can be described with reference to FIG. 1. The rendering space 100 is divided into a plurality of tiles 102 (which may, for example, be square or rectangular) and each tile is further divided into a regular arrangement of smaller areas 104, referred to herein as 'microtiles'. Within each tile 102 there is a pre-defined arrangement of microtiles 104 and in various examples, all of the microtiles 104 are the same size. Whilst FIG. 1 shows an arrangement of 5×4 microtiles 104 within a tile 102, in other examples there may be a different number of microtiles 104 in each tile 102. Each microtile 104 comprises the same number (and arrangement) of pixels 106 (where this may be dependent upon the mode of operation of the GPU pipeline) and within each pixel 106 there is a pre-defined arrangement of subsamples 108, i.e. a pre-defined set of subsample positions (e.g. four in the example shown in FIG. 1, although there may be many more, e.g. 64 subsample positions), although depending upon the mode of operation of the graphics processing pipeline, not all subsample positions may be used. For example, one mode (e.g. that does not use any anti-aliasing) may only use one of the subsample positions in each pixel and another mode (e.g. 4-MSAA) may use four subsample positions in each pixel and a further mode (e.g. 6-MSAA) may use six subsample positions in each pixel. In examples where there are a plurality of subsample positions in each pixel, the graphics processing pipeline may be able to operate in a plurality of different modes and different subsets of the subsample positions may be used in different modes (e.g. in different multisample/anti-aliasing modes). Unlike the arrangement of microtiles within a tile and pixels within a microtile, the arrangement of subsamples within a pixel may not be on a regular grid. In various examples the arrangement of subsamples within a pixel is the same for all pixels and in other examples the arrangement of subsamples may be different for different objects or edges (e.g. the subsample positions may vary dynamically).

The coordinates of each subsample position are defined with reference to a predefined position in a tile, the origin, and in the example shown in FIG. 1, this is the top left corner 110. Given the sub-division of the tile 102, as described above, the coordinates of a subsample 108 X,Y (as defined with reference to the tile origin 110) can be broken down into three components: x and y offsets of the microtile 104 relative to the tile 102, $X_{UT}$, $Y_{UT}$, x and y pixel positions within the microtile 104, $X_P$, $Y_P$ (which are defined relative to the origin of the microtile) and x and y subsample positions within the pixel 106, $X_S$, $Y_S$ (which are defined relative to the origin of the pixel), where: $(X,Y)=(X_{UT}+X_P+X_S, Y_{UT}+Y_P+Y_S)$.

The set of x and y offsets for the plurality of microtiles 104 relative to the tile origin 110 are the same for all tiles for a particular mode of operation, because each tile is subdivided in the same way into microtiles, but the offsets may differ for different modes of operation. Similarly, the set of x and y offsets for the plurality of pixels 106 relative to the microtile origin (which again may be defined to be the top left corner) are the same for all microtiles (in any tile) for a particular mode of operation, because each microtile in the rendering space comprises the same arrangement of pixels. The set of x and y subsample positions within a pixel, as defined relative to the pixel origin (which again may be defined to be the top left corner), is the same for all pixels (in any microtile and any tile) for a particular mode of operation.

As described in detail below, both the edge processing hardware and the depth calculation hardware operate in a similar manner and divide up the hardware that performs the calculations into a plurality of sub-units which each calculate a part of the result—separate hardware elements are provided to calculate the microtile components, the pixel position components and the subsample position components of the function being calculated by the edge processing or depth calculation hardware. A plurality of adders are used to combine the outputs from the hardware elements in different combinations (such that each component may be reused in a plurality of different combinations) to generate a plurality of output results for different subsamples. In the case of the depth calculation each output result is a full sum-of-products (SOP) value and in the case of the edge processing (which is usually implemented for each edge of a primitive), each result involves a comparison (i.e. does the particular subsample lie to the left or right of the edge of the primitive) and hence each output result may only be the sign of the SOP value (e.g. a single bit), although the full result (comprising all the bits of the SOP value) may be output in some examples.

Figure 4A:
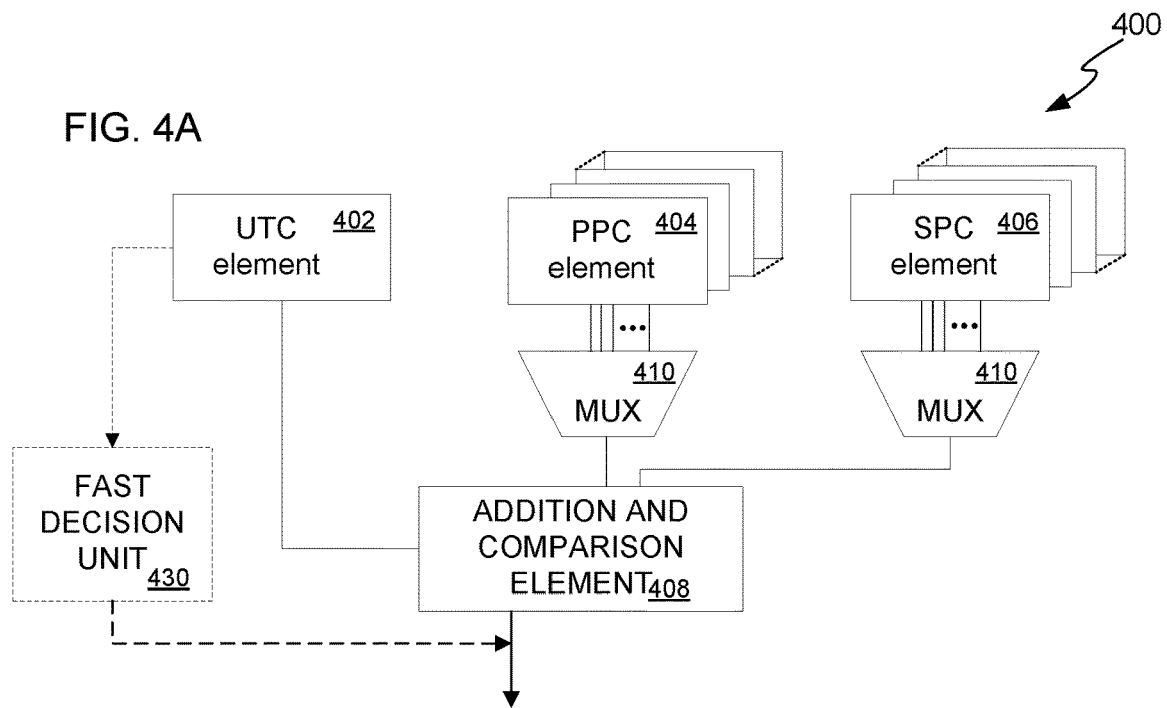
FIG. 4A shows a schematic diagram of a first example implementation of the edge test hardware or depth calculation hardware from FIG. 3A in more detail.
Figure 4B:
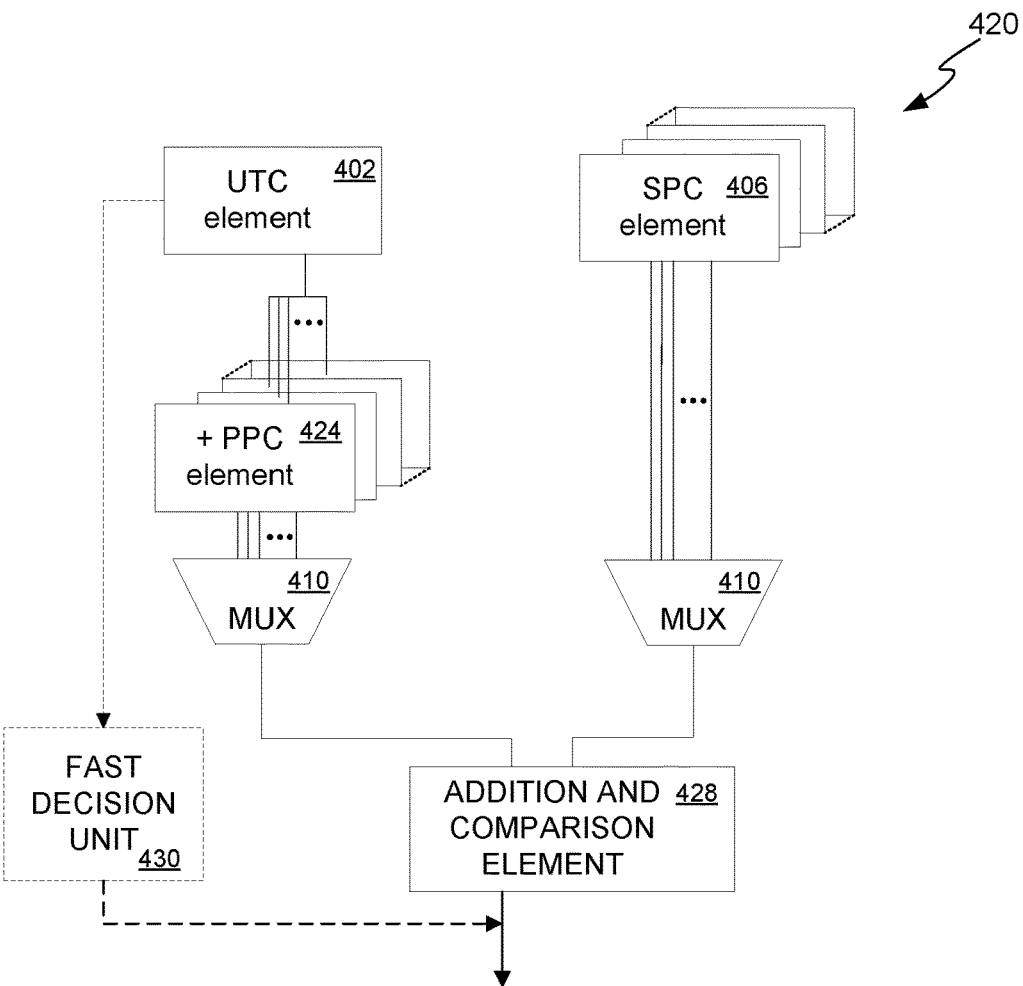
FIG. 4B shows a schematic diagram of a second example implementation of the edge test hardware or depth calculation hardware from FIG. 3A in more detail.

Although not shown in the examples described herein, in other examples, there may be additional contributions to the output results (e.g. a bias or tile-based adjustment factor) and these may be combined either within the microtile components or the final addition (e.g. in an addition and comparison unit 408, 428 as shown in FIGS. 4A and 4B and described below).

In addition to using adders to combine the outputs from the hardware elements, the edge processing hardware and/or the depth calculation hardware may further comprise a plurality of multiplexers to select the outputs which are input to an adder (and hence gate out any outputs that are not required) and this enables the hardware to be reconfigurable and operate in more than one different mode (e.g. more than one different anti-aliasing mode and/or a non-anti-aliasing mode). In addition, the inclusion of multiplexers to select outputs which are input to an adder enables the hardware described herein to be configured for a variable number of pixels and/or samples and this may be used to tailor the number of samples to bottlenecks that occur elsewhere in the GPU pipeline. For example, where only a subset of the subsample positions are used (e.g. in various examples, such as for a non-anti-aliasing mode, only a single subsample position is used per pixel), the results generated by those hardware elements that calculate the subsample position components for subsamples that are not being used, may be gated out (i.e. not selected) by the multiplexers and the clock for the registers inside the unused components may also be gated out.

The particular component results, as generated by the separate hardware components (i.e. the microtile component hardware elements, the pixel component hardware elements and the subsample component hardware elements) are re-used for multiple output results, e.g. the result output by a particular microtile component may be used for all subsamples within that microtile and the result output by a particular pixel component may be used for all subsamples in corresponding pixel locations in different microtiles and the result output by a particular subsample component may be used for all sub-samples in corresponding positions in different pixels (in the same or different microtiles). This leads to a reduction in the hardware size (e.g. area) and power consumption (e.g. compared to computing the full SOP independently for each of the subsample positions in a tile or compared to computing the full SOP independently for each of the subsamples in a single microtile in a tile and then repeatedly adding edge-specific coefficients (e.g. A, B, or C, as defined below) to each of these outputs to generate the results for the subsamples in the other pixels in a microtile) and enables multiple results to be generated in parallel (e.g. in various examples, results for all of the subsample positions in all of the pixels within a single microtile may be generated in parallel and this may then be repeated sequentially for multiple microtiles). Additionally, by structuring the hardware as described herein, it scales well, i.e. it can be easily extended to more modes and more output samples.

Figure 2:
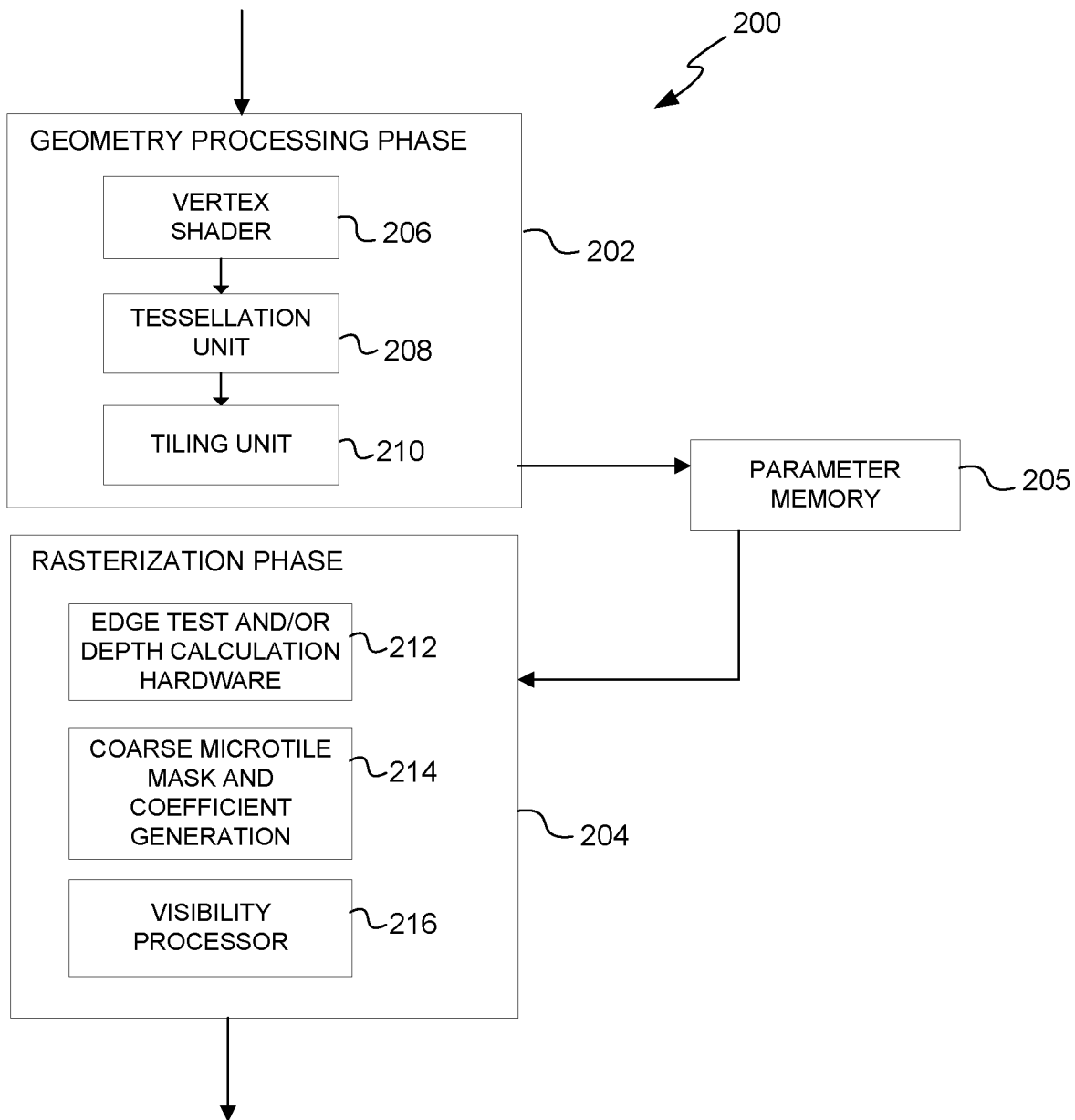
FIG. 2 is a schematic diagram of an example graphics processing unit (GPU) pipeline.

FIG. 2 shows a schematic diagram of an example graphics processing unit (GPU) pipeline 200 which may be implemented in hardware within a GPU and which uses a tile-based rendering approach. The hardware described herein may also be used in a GPU that instead uses alternative rendering approaches where the rendering processes groups of pixels (e.g. where immediate mode rendering is used). As shown in FIG. 2, the pipeline 200 comprises a geometry processing phase 202 and a rasterization phase 204. Data generated by the geometry processing phase 202 may pass directly to the rasterization phase 204 and/or some of the data may be written to memory (e.g. parameter memory 205) by the geometry processing phase 202 and then read from memory by the rasterization phase 204.

The geometry processing phase 202 comprises a vertex shader 206, tessellation unit 208 and tiling unit 210. Between the vertex shader 206 and the tessellation unit (or tessellator) 208 there may be one or more optional hull shaders, not shown in FIG. 2. The geometry processing phase 202 may also comprise other elements not shown in FIG. 2, such as a memory and/or other elements.

The vertex shader 206 is responsible for performing per-vertex calculations. Unlike the vertex shader, the hardware tessellation unit 208 (and any optional hull Shaders) operates per-patch and not per-vertex. The tessellation unit 208 outputs primitives and in systems which use vertex indexing, an output primitive takes the form of three vertex indices and a buffer of vertex data (e.g. for each vertex, a UV coordinate and in various examples, other parameters such as a displacement factor and optionally parent UV coordinates). Where indexing is not used, an output primitive takes the form of three domain vertices, where a domain vertex may comprise only a UV coordinate or may comprise a UV coordinate plus other parameters (e.g. a displacement factor and optionally, parent UV coordinates).

The tiling unit 210 generates per-tile display lists and outputs these, for example to the parameter memory 205. Each per-tile display list identifies, for a particular tile, those primitives which are at least partially located within that tile. These display lists may be generated by the tiling unit 210 using a tiling algorithm. Subsequent elements within the GPU pipeline 200, such as the rasterization phase 204, can then read the data from parameter memory 205.

The rasterization phase 204 renders some or all of the primitives generated by the geometry processing phase 202. The rasterization phase 204 comprises the edge test and/or depth calculation hardware 212, a coarse microtile mask and coefficient generation hardware block 214 and a visibility processor 216 and may comprise other elements not shown in FIG. 2. The coarse microtile mask and coefficient generation hardware block 214 generates the coefficients that are used in the edge test and/or depth calculation hardware 212 (e.g. A, B, and C, as defined below). The visibility processor 216 tracks the identity of each primitive that is visible at a given pixel.

The edge test and/or depth calculation hardware 212 in the rasterization phase 204 determines, for each primitive (e.g. each primitive on a per-tile display list) whether each of the subsample positions within that tile is inside or outside that primitive (based on edge test results for each edge of the primitive) and additionally calculates a depth value for the primitive at each subsample position which may be used to determine which primitive is in front (e.g. to perform hidden surface removal) or for any other purpose (e.g. by the shaders within the GPU pipeline). The edge test and/or depth calculation hardware 212 therefore performs two functions: edge testing and depth calculation and although these are shown within the same element 212 (because both functions are implemented in the same way, as described in detail below), it will be appreciated that in various examples the functions may be used and/or implemented independently and in various examples only one of the functions may be implemented in a particular graphics processing pipeline. The edge test and/or depth calculation hardware 212 is shown in more detail in FIG. 3A and comprises one or more instances of edge test hardware 302 and depth calculation hardware 304. In various examples the edge test and/or depth calculation hardware 212 may comprise one or more instances of edge test hardware 302 and no instances of depth calculation hardware 304. In other examples the edge test and/or depth calculation hardware 212 may comprise one or more instances of depth calculation hardware 304 and no instances of edge test hardware 302.

Each primitive has a plurality of edge equations and a depth equation associated with them (i.e. the edge equations and depth equation define the primitive). In the case of a triangular primitive 31 there are three edge equations (as shown in FIG. 3B) whereas for a primitive which is rectangular 32 or a parallelogram 33, there are four edge equations (although in such cases there is a pre-defined relationship between the equations for opposite pairs of edges, as described below). Each of the edge equations is a vector of the form:

$$f(x,y)=Ax+By+C$$

where A, B and C are constant coefficients specific to the polygon edge (and hence may be pre-calculated) and C has been pre-adjusted such that the scene origin is translated to the tile origin and these may be referred to herein as 'edge-specific coefficients'.

The edge test hardware 302 determines whether a subsample position (having coordinates x,y) is within the primitive by calculating the value, or the sign, of $f(x,y)$ for each of the edges. This is because:

If $f(x,y)$ is calculated to be positive (i.e. greater than zero), then the subsample point is to the right of the vector f If $f(x,y)$ is calculated to be negative (i.e. less than zero), then the subsample point is to the left of the vector f If $f(x,y)$ is calculated to be exactly zero, then the subsample point is precisely on vector f As a primitive has multiple edges (e.g. three for a triangle primitive 31), the edge test is performed for each edge. If the edge equations for a primitive are defined so that the vectors rotate around the primitive in a clockwise direction (as shown graphically in FIG. 3B), then the subsample position is within the primitive if it lies on or to the right of each edge vector. Therefore, the subsample position is within the primitive if $f(x,y)$ is not negative (i.e. it is zero or positive) for each of the edge vectors. Consequently, if the edge test hardware 302 outputs a single bit (e.g. the most-significant bit, MSB, of the result $f(x,y)$), then the outputs from the edge test hardware 302 for each of the edges (e.g. the three or four edges) can be combined using an AND gate and the subsample position is within the primitive if the output of the AND gate is a '1'. In other examples, the edge test hardware 302 may output more than a single bit (e.g. two bits) so that it can be determined if a subsample position lies exactly on the edge of a primitive.

It will be appreciated that if the edge vectors are defined differently then the conditions to find a subsample inside the primitive will be different (e.g. if the edge vectors are defined such that they rotate around the primitive in an anticlockwise direction, then the conditions will be that f(x,y) must be not greater than zero for each of the edge vectors) and the logic elements used to combine the outputs from the edge test hardware 302 for each of the edges will be different.

As two primitives will share each edge, a rule may be used so that a sample that is exactly on an edge (i.e. precisely on a vector f) is considered to be part of only one primitive and this rule may be referred to as the 'edge rule'. In various examples, a sample may be considered to be in a primitive if it lies precisely on a left or horizontal top edge of the primitive and not if it lies precisely on another edge of the primitive. In the edge test and/or depth calculation hardware 212 described herein, the microtile component value (as generated by the UTC element 402, described below) may be adjusted dynamically (e.g. based on the coefficients) by the value of the least significant bit to implement the edge rule.

As shown in FIG. 3A, the edge test and/or depth calculation hardware 212 may comprise multiple edge test hardware elements 302 and this enables the edge test calculation to be performed for multiple edges in parallel. In various examples the edge test and/or depth calculation hardware 212 comprises three edge test hardware elements 302 (e.g. one element for each edge of a triangular primitive 31) or four edge test hardware elements 302 (e.g. one element for each edge of a rectangular primitive 32 or a parallelogram primitive 33).

The depth calculation hardware 304 also calculates a SOP of the form:

$$f(x,y)=Ax+By+C$$

However, unlike the edge test hardware 304, instead of determining the sign of the result only (i.e. performing a comparison operation), the full value of f(x,y) is calculated and hence the output comprises a plurality of bits (e.g. 45 bits). The coefficients, inputs and output may be floating point numbers, normalised to a component exponent and the common exponent is bypassed to the output to reduce the hardware size, after which the output may again be normalised to a floating point number. Alternatively the coefficients, inputs and output may be fixed-point values.

Although each hardware element 302, 304 is shown as a separate, self-contained unit in FIG. 3A (e.g. each instance of the edge test hardware 302 and the single instance of the of the depth calculation hardware 304 is represented as a separate box without any overlap or interconnection), there may be signals that are shared between elements and/or hardware logic that is shared between elements. For example, as the subsample positions (when defined relative to the pixel origin, rather than the tile origin) used by each of the hardware elements are the same (i.e. each edge relies upon the same sampling pattern within pixels), there may be shared logic that performs a look-up (in a LUT) or calculation of the subsample positions (as defined relative to the pixel origin) and then the resulting subsample position data may be provided to all the hardware elements 302, 304. In addition (or in other examples), where multiplexers are used, the multiplexers in each of the hardware elements 302, 304, or each of the edge test hardware elements 302 only, may be driven by the same multiplexer select (or mode) signals, which may be generated in one of the hardware elements 302, 304 or by a separate hardware element (not shown in FIG. 3A) based on the mode of operation of the graphics pipeline (e.g. the anti-aliasing mode being used). The select signals may, for example, be encoded as one-hot signals with each of a set of on-hot signals encoding a different distinct mode of operation of the hardware.

FIGS. 4A and 4B show two different example implementations of the edge test hardware 302 or depth calculation hardware 304 in more detail. As described in more detail below, both of the hardware arrangements 400, 420 may be implemented to perform either an edge test or a depth calculation.

The first example hardware arrangement 400, shown in FIG. 4A, comprises a single microtile component hardware element 402, a plurality (e.g. 16) of pixel component hardware elements 404, one or more (e.g. 16) subsample component hardware elements 406 and a plurality (e.g. 64) of addition and comparison elements (which may, for example, be implemented as a plurality of adders) 408, with each addition and comparison element 408 generating an output result for a different subsample position within the same microtile. The hardware arrangement 400 may additionally comprise a plurality of multiplexers 410 that connect the microtile component hardware element(s) 402, pixel component hardware elements 404 and subsample component elements 406 to the addition and comparison elements 408. In examples that include multiplexers 410, one or more select signals (which may also be referred to as 'mode signals' and described above may comprise a one-hot signal that encodes a particular mode of operation of the hardware) control the operation of the multiplexers 410 and in particular control which combination of the hardware elements 402, 404, 406 are connected to each particular addition and comparison element 408 (e.g. for each addition and comparison element 408, which one of the plurality pixel component hardware elements 404 and which one of the subsample component hardware elements 406, where there is more than one, are connected to the addition and comparison element 408, with each addition and comparison element 408 also being connected to the single microtile component hardware element 402).

If, as described above, both the edge test hardware 302 and depth calculation hardware 304 evaluates a SOP of the form:

$$f(x,y)=Ax+By+C$$

where the values of the coefficients A, B, C may be different for each SOP evaluated, then the microtile component hardware element 402 evaluates:

$$f_{UT}(x_{UT},y_{UT})=Ax_{UT}+By_{UT}+C$$

where the values of $x_{UT}$ and $y_{UT}$ (the microtile coordinates relative to the tile origin 110), differ for different microtiles. The microtile component hardware element 402 may receive, as inputs, the values of A, B, C, $x_{UT}$ and $y_{UT}$ and the element outputs a single result $f_{UT}$.

The pixel component hardware elements 404 evaluate:

$$f_P(x_P,y_P)=Ax_P+By_P$$

for different values of $x_P$ and $y_P$ (where these values differ for different pixels within a microtile). The set of values of $x_P$ and $y_P$ (i.e. the values of $x_P$ and $y_P$ for all pixels within a microtile, as defined relative to the microtile origin) is the same for all microtiles and they may, for example, be calculated by the edge test hardware 302 and depth calculation hardware 304 or may be accessed from a look-up table (LUT). In various examples, the origin of a microtile may be defined as the top left corner of each microtile and the values of $x_P$ and $y_P$ may be integers and so the determination of the values requires little or no computation (and hence this provides an efficient implementation). Referring back to the example shown in FIG. 1, where each microtile comprises four rows of 5 pixels, then the set of values of $x_P$ is {0, 1, 2, 3, 4} (which may also be written as [0,4]) and the set values of $y_P$ is {0, 1, 2, 3} (which may also be written [0,3]). Each pixel component hardware element 404 receives as input A and B and may also receive the set of values of $x_P$ and $y_P$ (e.g. in examples where these are not integers). Each element 404 outputs a single result $f_P$ and consequently the calculation of $f_P$ may be merged with any calculations that are performed to determine $x_P$ and/or $y_P$.

The subsample component hardware elements 406 evaluate:

$$f_S(x_S, y_S) = Ax_S + By_S$$

for different values of $x_S$ and $y_S$ (where these values differ for different subsamples within a pixel). The set of values of $x_S$ and $y_S$ (i.e. the values of $x_S$ and $y_S$ for all subsample positions within a pixel, as defined relative to the pixel origin) may be the same for all pixels and they may be calculated within the element 406, calculated centrally by shared hardware logic within the hardware arrangement 400 and/or may be accessed from a look-up table (LUT), again either by the element 406 or shared hardware logic. Each subsample component hardware element 406 receives as input A and B and may also receive the values of $x_S$ and $y_S$ where these are not calculated within the element. Each element 406 outputs a single result $f_S$ and consequently the calculation of $f_S$ may be merged with any calculations that are performed to determine $x_P$ and/or $y_P$. In various examples (such as non-anti-aliasing modes) there is only a single subsample position per pixel and hence there may only be a single value of $x_S$ and $y_S$.

In various examples where there is more than one subsample component hardware element 406, the subsample component hardware elements 406 may not all be identical and instead there may be two types of subsample component hardware elements 406. For example, the first type of subsample component hardware elements may use a look-up table to determine the subsample coordinates (i.e. the values of $x_S$ and $y_S$) and the second type of subsample component hardware elements may use constant multipliers to calculate the subsample coordinates. These different types may, for example, be used for different modes of operation.

The addition and comparison elements 408 evaluate:

$$f(x,y) = f_{UT} + f_P + f_S$$

and each addition and comparison element 408 sums a different combination of $f_{UT}$, $f_P$, and $f_S$ values (where the particular combination of values are provided as inputs to the addition and comparison unit 408) and the combination is either fixed (i.e. hardwired between the elements) or is selected by one or more multiplexers 410 (where provided). In examples where the hardware arrangement 400 functions as edge test hardware 302, only the MSB (or sign-bit) of the result (i.e. of f(x,y)) is output and hence the full result does not need to be calculated by the addition and comparison element 408 and the addition and comparison element 408 may perform a comparison rather than an addition (which reduces the overall area of the hardware). This MSB indicates the sign of the result (because a>b==sign (b-a)) and, as described above, this indicates whether the subsample position is to the left or right of the edge. In examples where the hardware arrangement 400 functions as depth calculation hardware 304, the full result (i.e. all the bits of f(x,y), which may, for example, comprise 45 bits) is output (and as described above, this may be component with a common exponent value that is passed directly to the output).

The operation of the hardware arrangement 400 in FIG. 4A can further be described with reference to an example in which the anti-aliasing mode 4-MSAA is used and hence there are four subsamples per pixel. In such an example the microtile component hardware element 402 evaluates one $f_{UT}$ value relating to a single microtile. If there are sixteen pixels per microtile (arranged in a 4×4 grid), then the x coordinates of the pixels are 0, 1, 2 and 3 and the y coordinates of the pixels are 0, 1, 2 and 3. Sixteen instances of the pixel component hardware element 404 each evaluate a different one of the 16 per-pixel components, for j=[0,15]:

$$f_{P[j]} = (A \times [0,3]) + (B \times [0,3])$$

although the first component, $f_{P[0]}$, may always be zero and hence in various examples, only fifteen (i.e. one less than the number of pixels per microtile) instances of the pixel component hardware element may be provided in the hardware arrangement 400. Each pixel component hardware element 404 may be implemented using a combination of adders and without requiring any multiplication and hence this provides an efficient hardware implementation. For example, A×3 can simply be implemented as A+A+A. The small set of possible multiplicands assists with such an implementation.

As there are four subsamples per pixel, the four instances of the subsample component hardware element 406 each evaluate a different one of the four subsample components, for i=[0,3]:

$$f_{S[i]} = Ax_{S[i]} + By_{S[i]}$$

As noted above, although the subsamples are not on a fixed grid (unlike the pixels), they are in the same position for each pixel and hence their coordinates may be stored in a LUT and accessed from the LUT by the subsample component hardware elements 406. Alternatively, a constant multiplier (i.e. hardware where a multiplication operation is instead implemented as a minimum number of additions, using left shifting where appropriate) may be used to calculate the coordinates, where the constant multiplier may be provided for each subsample component hardware element but may be subsequently merged at least in part by the synthesis tool. An example of an operation performed by a constant multiplier is to implement the operation 6a+14b as (a<<1)+(a<<2)+(b<<4)−(b<<1), where '<<' indicates left shifting by the number of positions given by the following integer (e.g. <<1 indicates left shifting by one).

As there is one microtile component, $f_{UT}$, 16 pixel components, $f_P$ (although one of these may be zero) and 4 subsample components, $f_S$, there are 64 possible combinations (1×16×4) and hence the hardware arrangement 400 comprises 64 instances of the addition and comparison element 408, each evaluating a different one of the 64 results:

$$f_{[k]} = f_{UT} + f_{P[j]} + f_{S[i]}$$

for=[0,3], j=[0,15] and k =[0,63].

In another example, where the hardware arrangement 400 is designed to operate in both the anti-aliasing modes 4-MSAA and 6-MSAA, there are six subsamples per pixel. In such an example the microtile component hardware element 402 (as before) evaluates one $f_{UT}$ value relating to a single microtile. Again, 16 instances of the pixel component hardware element 404 each evaluate a different one of the 16 per-pixel components, for j=[0,15]:

$$f_{P[j]} = (A \times [0,3]) + (B \times [0,3])$$

Although, as described above, the first component, $f_{P[0]}$, may always be zero and hence in various examples, only fifteen (i.e. one less than the number of pixels per microtile) instances of the pixel component hardware element may be provided in the hardware arrangement 400.

As there are six subsamples per pixel, there are six instances of the subsample component hardware element 406 and each evaluates a different one of the six subsample components, for i'=[0,5]:

$$f_{S[i']} = Ax_{S[i']} + By_{S[i']}$$

In this example, as there is one microtile component, $f_{UT}$, 16 pixel components, $f_P$ (although one of these may be zero) and 6 subsample components, $f_S$, there are 96 possible combinations (1×16×6). If the hardware arrangement 400 only comprises 64 instances of the addition and comparison element 408, not all combinations can be computed in parallel and where the hardware operates in 4-MSAA mode, only 64 output results are needed. Consequently, when operating in 4-MSAA mode, multiplexers 410 are used to select the 64 relevant combinations (i.e. gating out 2 subsample components from each pixel) and each addition and comparison element 408 evaluates a different one of the selected 64 combinations:

$$f_{[k]} = f_{UT} + f_{P[j]} + f_{S[i]}$$

for=[0,3], j=[0,15] and k=[0,63]. When operating in other modes (e.g. 8-MSAA mode), that need to generate more output results than there are addition and comparison elements 408 in the hardware 400, either the microtile may be made smaller (i.e. such that it contains fewer pixels) or only a subset of the sample positions are calculated each pixel. In contrast, for a non-anti-aliasing (or non-MSAA) mode, there is only a single sample per pixel (e.g. at the centre of the pixel) and in such cases only a subset of the addition and comparison units 408 are used and all but one of the SPC elements 406 may be gated out. After calculating the first 64 output results, the multiplexers are then used to select the remaining 32 combinations so that all 64 output results are generated.

The second example hardware arrangement 420, shown in FIG. 4B, is a variation on the hardware arrangement 400 shown in FIG. 4A. This second example hardware arrangement 420 comprises a single microtile component hardware element 402, a plurality (e.g. 16) of pixel component hardware elements 424 (although these operate slightly differently to those shown in FIG. 4A and described above), one or more (e.g. 16) subsample component hardware elements 406 and a plurality (e.g. 64) of addition and comparison elements (which may, for example, be implemented as a plurality of adders) 428 (although these operate slightly differently to those shown in FIG. 4A and described above), with each addition and comparison element 428 generating an output result. Like the hardware arrangement 400 shown in FIG. 4A, the hardware arrangement 420 shown in FIG. 4B may additionally comprise a plurality of multiplexers 410 controlled by select signals.

If, as described above, both the edge test hardware 302 and depth calculation hardware 304 evaluate a SOP of the form:

$$f(x,y) = Ax + By + C$$

where the values of the coefficients A, B, C may be different for each SOP evaluated, then the microtile component hardware element 402 operates as described above with reference to FIG. 4A; however, instead of the output being fed directly into the addition unit (as shown in FIG. 4A), in the arrangement 420 of FIG. 4B, the output of the microtile component hardware element 402 is input to each of the plurality of pixel component hardware elements 424. Each of the one or more subsample component hardware elements 406 also operate as described above with reference to FIG. 4A.

The pixel component hardware elements 424 in the arrangement 420 of FIG. 4B do not operate in the same way as those shown in FIG. 4A. They receive as input (in addition to A and B) the output from the microtile component hardware element 402, $f_{UT}$, and evaluate:

$$f_{UT}(x_{UT}, y_{UT}) + f_P(x_P, y_P) = f_{UT}(x_{UT}, y_{UT}) + Ax_P + By_P$$

for different values of $x_P$ and $y_P$ (where these values differ for different pixels within a microtile). As described above (with reference to FIG. 4A) the values of $x_P$ and $y_P$ (i.e. the values of $x_P$ and $y_P$ for all pixels within a microtile, as defined relative to the microtile origin) may be integers and hence the pixel component hardware elements 424 may comprise an arrangement of adders to add the appropriate multiples of A and/or B to the input value generated by the microtile component hardware element, $f_{UT}$, 402 and this may be implemented without using any multipliers and this reduces the size and/or power consumption of the addition and comparison unit 428. Each element 424 outputs a single result $f_{UT} + f_P$ and as described above, the calculation of $f_P$ and hence the calculation of the single result may be merged with any calculations that are performed to determine $x_P$ and/or $y_P$.

The addition and comparison elements 428 evaluate:

$$f(x,y) = f_{UT} + f_P + f_S$$

in a similar manner to the addition and comparison elements 408 described above; however the inputs are different since the values of $f_{UT}$ and $f_P$ have already been combined in the pixel component hardware elements 424. Each addition and comparison element 428 sums a different combination of $(f_{UT} + f_P)$ and $f_S$ values (where the particular combinations of values are provided as inputs to the addition and comparison units 428) and the combination is either fixed (i.e. hardwired) or is selected by one or more multiplexers 410 (where provided). As described above, in examples where the hardware arrangement 420 functions as edge test hardware 302, only the MSB (or sign-bit) of the result (i.e. of f(x, y)) is output and hence the full result does not need to be calculated. This MSB indicates the sign of the result and, as described above, this indicates whether the subsample position is to the left or right of the edge. In examples where the hardware arrangement 420 functions as depth calculation hardware 304, the full result (i.e. all the bits of f(x,y)) is output.

The operation of the hardware arrangement 420 in FIG. 4B can further be described with reference to the example as used previously, in which the anti-aliasing mode 4-MSAA is used and hence there are four subsamples per pixel. In such an example the microtile component hardware element 402 evaluates one $f_{UT}$ value relating to a single microtile. If there are sixteen pixels per microtile (arranged in a 4×4 grid), then the x coordinates of the pixels are 0, 1, 2 and 3 and the y coordinates of the pixels are 0, 1, 2 and 3. Sixteen instances of the pixel component hardware element 424 each evaluate a different one of the 16 pixel components, for j=[0,15]:

$$(f_{UT} + f_P)_{[j]} = f_{UT} + (A \times [0,3]) + (B \times [0,3])$$

although the first component, $(f_{UT} + f_P)_{[0]}$, may always be equal to $f_{UT}$ and hence in various examples, only fifteen (i.e.

one less than the number of pixels per microtile) instances of the pixel component hardware element 424 may be provided in the hardware arrangement 420. Each pixel component hardware element 424 may be implemented using a combination of adders and without requiring any multiplication and hence this provides an efficient hardware implementation and additionally, in various examples, there may be sharing of intermediate results between the pixel component hardware elements 424.

As in this example there are four subsamples per pixel, there are four instances of the subsample component hardware element 406 and each evaluates a different one of the four per-subsample components, for i=[0,3]:

$$f_{S[i]} = Ax_{S[i]} + By_{S[i]}$$

As noted above, although the subsamples are not on a fixed grid (unlike the pixels), they are in the same position for each pixel and hence their coordinates may be stored in a LUT and accessed from the LUT by the subsample component hardware elements 406. Alternatively, a constant multiplier may be used to calculate the coordinates, where the constant multiplier may be provided for each subsample component hardware element but may be subsequently merged at least in part by the synthesis tool.

As there are 16 outputs from the pixel component hardware elements 424, $(f_{UT}+f_P)_{[j]}$ and 4 subsample components, $f_{S[i]}$, there are 64 possible combinations (16×4) and hence the hardware arrangement 420 comprises 64 instances of the addition and comparison element 428, each evaluating a different one of the 64 results:

$$f_{[k]} = (f_{UT}+f_P)_{[j]} + f_{S[i]}$$

for=[0,3], j=[0,15] and k=[0,63].

The hardware arrangement 420 shown in FIG. 4B may utilize the fact that the value of $f_P$ can be calculated quickly or alternatively the UTC calculation may be performed in the previous pipeline stage. By using this arrangement 420 the overall area of the hardware arrangement 420 may be reduced compared to the arrangement 402 shown in FIG. 4A (e.g. the addition and comparison elements 428 may be smaller than addition and comparison elements 408); however, each of the results output by the pixel component hardware elements 424 comprises more bits (e.g. approximately 15 more bits) than in the arrangement 400 shown in FIG. 4A.

Although FIG. 4B shows the microtile component hardware element 402 aligned with the subsample component hardware element 406, these calculations may not be performed in parallel. In various examples, a first pipeline stage in the hardware arrangement may calculate the microtile component $f_{UT}$ (in the microtile component hardware element 402) and in parallel perform the look-up of the subsample positions (e.g. from a LUT, as described above). This maximises the time available for the computations in the second pipeline stage in which the pixel component hardware element 424 adds the pixel components $f_P$ to the microtile component $f_{UT}$ and in parallel the subsample component hardware element 406 calculates the subsample components $f_S$.

Although FIGS. 4A and 4B show the hardware elements 402, 404, 406, 424 being connected to a single addition and comparison element 408, 428 (optionally via multiplexers 410), this is to reduce the complexity of the diagram only. As described above, each addition and comparison element 408, 428 generates an output result and the hardware arrangement 400, 420 (which may function as edge test hardware 302 or depth calculation hardware 304) is, in all examples, arranged to calculate a plurality of results (e.g. 64 results) in parallel and hence comprises a plurality of addition and comparison elements 408, 428 (e.g. 64 addition and comparison elements).

Although FIGS. 4A and 4B both show only a single microtile component element 402, such that all the results generated in parallel by the hardware arrangement 400, 420 relate to subsample positions within the same microtile, in other examples the hardware arrangement may comprise a plurality of microtile component elements 402 and in such examples, the results generated in parallel by the hardware arrangement may relate to subsample positions within more than one microtile.

In various examples and where the hardware arrangement 400, 420 shown in FIG. 4A or 4B functions as edge test hardware 302, the hardware arrangement 400, 420 may further comprise a plurality of fast decision units 430 (which may also be referred to as fast fail/pass logic elements), one for each microtile and the condition is then applied to all outputs (e.g. the outputs from all of the plurality of addition and comparison elements 408, 428). The fast decision unit 430 receives the output generated by the microtile component hardware element 402 and determines whether, based on the output received, any possible contributions from a pair comprising a pixel component hardware element 404, 424 and a subsample component element 406 could change the value of the MSB of the value output by the microtile component hardware element 402.

If the value output by the microtile component hardware element 402, $f_{UT}$, is sufficiently positive that no pixel or subsample contribution could make the resultant f(x, y) negative (after taking into consideration any edge rule adjustment), i.e. if:

$$f_{UT} > |f_{Pmin}| + |f_{Smin}|$$

where $f_{Pmin}$ is the minimum, i.e. most negative, possible value of $f_P$ and $f_{Smin}$ is the minimum, i.e. most negative, possible value of $f_S$, then the hardware arrangement 400, 420 can determine whether the edge test passes or fails without evaluating the outputs generated by the pixel component hardware elements 404, 424 and the subsample component elements 406 (i.e. without completely evaluating the final sum).

Similarly, if the value output by the microtile component hardware element 402, $f_{UT}$, is sufficiently negative that no pixel or subsample contribution could make the resultant f(x,y) positive or zero, i.e. if:

$$|f_{UT}| > f_{Pmax} + f_{Smax}$$

where $f_{Pmax}$ is the maximum, i.e. most positive, possible value of $f_P$ and $f_{Smax}$ is the maximum, i.e. most positive, possible value of $f_S$, then the hardware arrangement 400, 420 can determine whether the edge test passes or fails without evaluating the outputs generated by the pixel component hardware elements 404, 424 and the subsample component elements 406 (i.e. without completely evaluating the final sum).

Figure 5A:
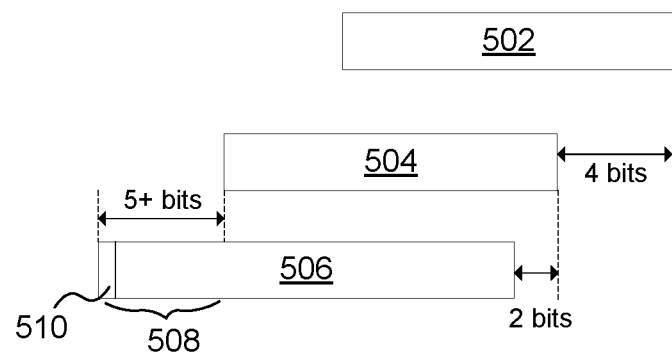
FIGS. 5A and 5B shows graphic representations of the addition performed by the hardware arrangement from FIGS. 4A and 4B respectively.
Figure 5B:
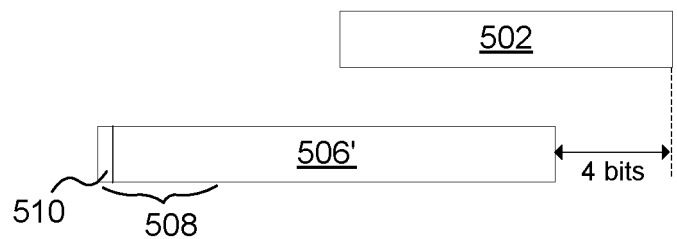

The implementation of the fast decision unit 430 reduces the width of the addition that is performed by each addition and comparison element 408, 428 as a number of (e.g. three) MSBs from the output generated by the microtile component hardware element 402 can be omitted from the addition. The precise number of MSBs that can be omitted is determined by the number of microtiles in a tile (i.e. how many $X_{UT}$ bits there are) and the precise constrains on coefficient C. This can be described with reference to the examples shown in FIGS. 5A and 5B. FIG. 5A shows a graphic representation of the addition performed by an addition and comparison element 408 in FIG. 4A and FIG. 5B shows a graphic representation of the addition, which is actually only a comparator, performed by the addition and comparison unit 428 in combination with the pixel component hardware element 424 in FIG. 4B. As shown in FIGS. 5A and 5B, the outputs from the subsample component hardware element 406 (output 502), pixel component hardware element 404 (output 504) and microtile component hardware element 402 (output 506) in FIG. 4A are offset with respect to each other as they operate at different levels of granularity. Similarly, the outputs from the subsample component hardware element 406 (output 502) and the combination of the microtile component hardware element 402 and pixel component hardware element 424 (output 506') in FIG. 4A are offset with respect to each other as they operate at different levels of granularity. The offsets shown in FIGS. 5A and 5B are by way of example only as they depend upon a number of factors (e.g. the precision of the sample locations, the number of pixels in a microtile, the number of microtiles in a tile, etc.). The fast decision unit 430 identifies those combinations of $f_{UT}$, $f_P$, $f_S$ where a single carry into the first portion 508 of the output 506 from the microtile component hardware element 402 cannot change the value of the MSB 510 of that output value 506, 506'. Consequently, based on a determination of the minimum number of carries into the first portion 508 that are required to change the value of the MSB 510, a number of the MSBs of the output value 506 from the microtile component hardware element 402 or the output value 506' from the combination of the microtile component hardware element 406 and the pixel component hardware element 424 can be excluded from the addition operation. Where the fast decision unit 430 is provided, the speed of operation of the edge test hardware 302 may also be increased in some circumstances (i.e. where one of the two conditions above is satisfied).

As described above the hardware arrangements 400, 420 are both suitable for use in GPUs which use any rendering approach in which groups of pixels are processed together and this includes both tile-based rendering and immediate-mode rendering. In various examples, the hardware 420 as shown in FIG. 4B with the inclusion of a fast decision unit 430 may be particularly suited to GPUs which use immediate-mode rendering. This is because immediate-mode rendering results in a larger UTC element 402 than for tile-based rendering (because the range of coordinates may now cover the entire screen area).

The selection of which hardware arrangement 400, 420 to use in any implementation will be dependent upon various factors, including but not limited to the rendering approach used by the GPU. The hardware arrangement 400 shown in FIG. 4A has less delay and fewer registers before the multiplexers 410 for the PPC elements 404, compared to the arrangement in the hardware 420 shown in FIG. 4B; however, the addition and comparison element 408 in FIG. 4A is larger and uses more power than the addition and comparison unit 428 in FIG. 4B. Consequently, where there are a large number of addition and comparison elements 408 (e.g. 64 or more), then use of the hardware arrangement 420 shown in FIG. 4B may be more suitable. However, in the hardware arrangement 420 shown in FIG. 4B it is not possible to gate out the PPC elements 424 if only the microtile index changes, but for 64 or more outputs, the reduced complexity of the addition and comparison unit 428 may provide a dominant effect with respect to power consumption of the hardware.

FIG. 3A shows three instances of the edge test hardware 302, one for each edge of a triangular primitive 31 as shown in FIG. 3B. In examples where the primitive has more than three sides, e.g. where it is a rectangle 32, parallelogram 33 or any other n-sided convex polygon, there may be a separate instance of the edge test hardware 302 for each edge. In various examples, however, where there is a pre-defined relationship between the edge vectors for two or more edges, then some of the outputs calculated may be re-used when performing the edge test for each of those edges and this further reduces the area of the overall hardware. For example, if the primitive is a rectangle 32 or a parallelogram 33, as shown in FIG. 3B, there is a pre-defined relationship between the coefficients in the opposing pairs of edge vectors, i.e. $f_1$ and $f_3$, $f_2$ and $f_4$. In particular, if:

$$f_1(x,y)=Ax+By+C_1$$

Then:

$$f_3(x,y)=-Ax-By+C_3$$

Consequently, it is not necessary to duplicate all the pixel component hardware elements 404 and subsample component hardware elements 406 for the negated coefficients and instead the outputs from the pixel component hardware elements 404 for the first edge can be reused for the second edge and the outputs from the subsample component hardware elements 406 for the first edge can be reused for the second edge.

This may, for example be implemented, as follows: where the hardware arrangement 400 of FIG. 4A is used, the outputs from the pixel component hardware elements 404:

$$f_P(x_P,y_P)=Ax_P+By_P$$

for the first edge, $f_1$, may be inverted and reused for the second edge where:

$$f_P(x_P,y_P)=-Ax_P-By_P$$

Similarly, the outputs from the subsample component hardware elements 406:

$$f_S(x_S,y_S)=Ax_S+By_S$$

for the first edge, $f_1$, may be inverted and reused for the second edge where:

$$f_S(x_S,y_S)=-Ax_S-By_S$$

Or alternatively, the negations of the outputs from the pixel component hardware elements 404 and subsample component hardware elements 406 can be omitted and instead the comparison performed in the addition and comparison unit 408 may be modified, such that for the first edge the comparison is:

$$f_{UT1}+f_P+f_S>0$$

And for the second edge, the modified comparison is:

$$f_{UT2}+f_P+f_S\leq 0$$

(where $f_{UT2}$ is calculated with the C coefficient negated) and this may result in a more efficient hardware implementation (e.g. in terms of size and/or power).

This reuse of all the outputs from various hardware elements 404, 406 for more than one edge results, as described above, in an overall area saving. For example, the area of hardware for performing edge testing for a pair of opposing edges may be less than 1.5 times the area of the hardware for performing edge testing for a single edge.

The hardware for both edge detection and depth calculation described above provides an efficient implementation of a SOP. Using the implementations described above, the delay of the hardware is reduced by reducing the complexity of the addition operations that are performed to achieve a single result, the hardware can provide many subsample results in parallel (e.g. up to 64 subsample results from up to 16 pixels within a single microtile) and is scalable to provide increased parallelism, increase the number of outputs and/or introduce additional modes of operation (e.g. additional anti-aliasing modes), and the hardware is both smaller (in size/area) and has a reduced power consumption. The relatively small size of the hardware described herein make it possible to fit each of the components into a single pipeline stage, whereas a full $A*X\text{-}_{ut+pp+sp}$ may require internal pipeline registers for high clock spends, and these add both area and delay.

Figure 6:
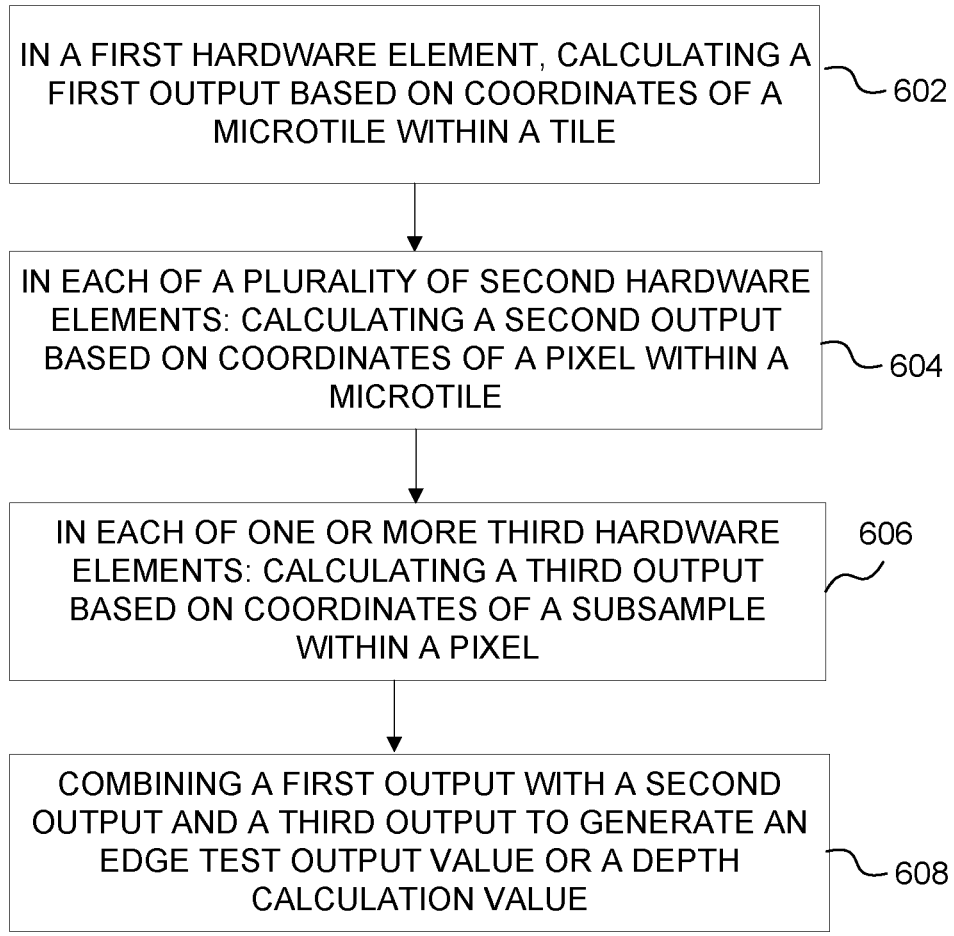
FIG. 6 is a flow diagram of an example method of performing edge detection and/or depth calculation.

FIG. 6 is a flow diagram of an example method of performing edge detection and/or depth calculation in an efficient manner (i.e. in terms of size of hardware and power consumption) for a rendering space divided into tiles and wherein each tile is subdivided into a plurality of microtiles, each microtile comprising an identical arrangement of pixels and each pixel comprising an identical arrangement of subsample positions. This method uses the hardware described above and shown in FIGS. 3A, 4A and 4B and may be part of a method of rendering in a graphics processing pipeline.

The method comprises, in a first hardware element 402, calculating a first output based on coordinates of a microtile (block 602). The method further comprises, in each of a plurality of second hardware elements 404, 424, calculating one of a plurality of second outputs based on coordinates of one of a plurality of pixels within the microtile, (block 604) wherein each of the plurality of second hardware elements and each of the plurality of second outputs relates to a different one of the plurality of pixels. The method further comprises, in each of one or more third hardware elements 406, calculating a third output based on coordinates of a subsample within each pixel, (block 606). In examples where there is more than one third hardware element 406 (i.e. a plurality of third hardware elements 406), each of the plurality of third hardware elements and each of the plurality of third outputs (generated by different ones of the plurality of third hardware elements) relates to a different one of the plurality of subsamples. The method further comprises generating a plurality of output values by combining the first output with different combinations of one of the second outputs and a third output using one or more addition units (block 608), wherein each output value is a depth calculation or edge test output.

As described above, a depth calculation output value comprises a plurality of bits whereas an edge test output value may comprise only a single bit (e.g. the MSB of the sum of the three combined outputs). Consequently, in the case of depth calculation, the one or more addition units may comprise a plurality of adders and in the case of edge calculation, the one or more addition units may perform a comparison instead of a full addition.

As described above, the combining of the first output, a second output and a third output (in block 608) may be implemented in a plurality of addition and comparison units 408, each addition unit receiving as input the first output and a combination of one of the second outputs and a third output (e.g. as shown in FIG. 4A and described above). Alternatively, the combining operation (in block 608) may be a two stage process in which the first output is combined with different ones of the second outputs within the second hardware elements 424 and then, in each of a plurality of addition and comparison units 428, a third output is combined with one of the outputs from the second hardware elements.

Figure 7:
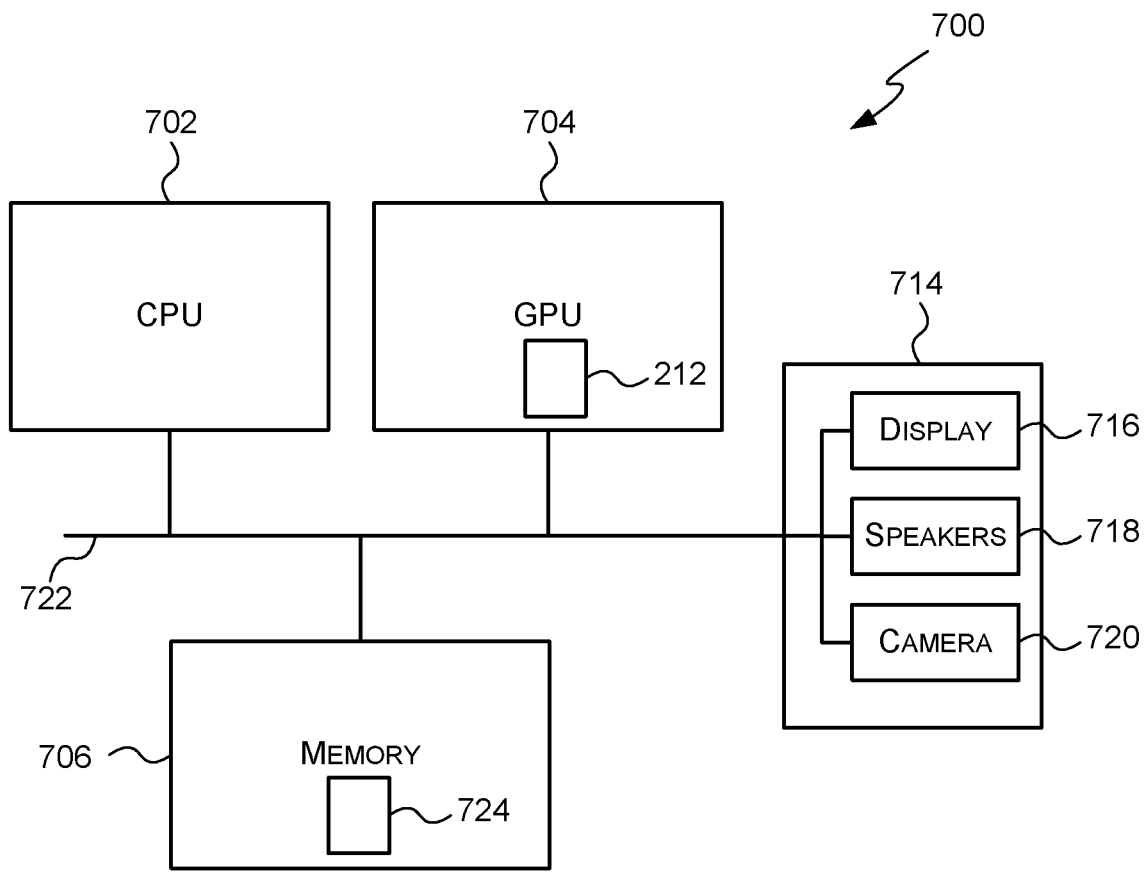
FIG. 7 shows a computer system in which a graphics processing pipeline comprising the edge test and/or depth calculation hardware is implemented.

FIG. 7 shows a computer system in which the graphics processing systems described herein may be implemented. The computer system comprises a CPU 702, a GPU 704, a memory 606 and other devices 714, such as a display 716, speakers 718 and a camera 720. The graphics processing pipeline, described above, and in particular the edge test and/or depth calculation hardware 212 may be implemented within the GPU 704. The components of the computer system can communicate with each other via a communications bus 722. A data store 724, which may comprise one or more LUTs used by the edge test and/or depth calculation hardware 212 may be implemented as part of the memory 706.

The hardware arrangements shown in FIGS. 2, 3A, 4A and 4B and described above are shown as comprising a number of functional blocks. This is schematic only and is not intended to define a strict division between different logic elements of such entities. Each functional block may be provided in any suitable manner. It is to be understood that intermediate values described herein as being formed by any of the elements (e.g. any of the elements in FIGS. 4A and 4B) need not be physically generated by the hardware arrangement at any point and may merely represent logical values which conveniently describe the processing performed by the hardware (e.g. the graphics processing pipeline) between its input and output.

The edge test and/or depth calculation hardware 212 described herein may be embodied in hardware on an integrated circuit. The edge test and/or depth calculation hardware 212 described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing pipeline configured to perform any of the methods described herein, or to manufacture a graphics processing pipeline comprising edge test and/or depth calculation hardware described herein. An integrated circuit definition dataset may be, for example, an integrated circuit description.

Therefore, there may be provided a method of manufacturing, at an integrated circuit manufacturing system, a graphics processing pipeline comprising edge test and/or depth calculation hardware as described herein. Furthermore, there may be provided an integrated circuit definition dataset that, when processed in an integrated circuit manufacturing system, causes the method of manufacturing a graphics processing pipeline comprising edge test and/or depth calculation hardware to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing pipeline will now be described with respect to FIG. 8.

Figure 8:
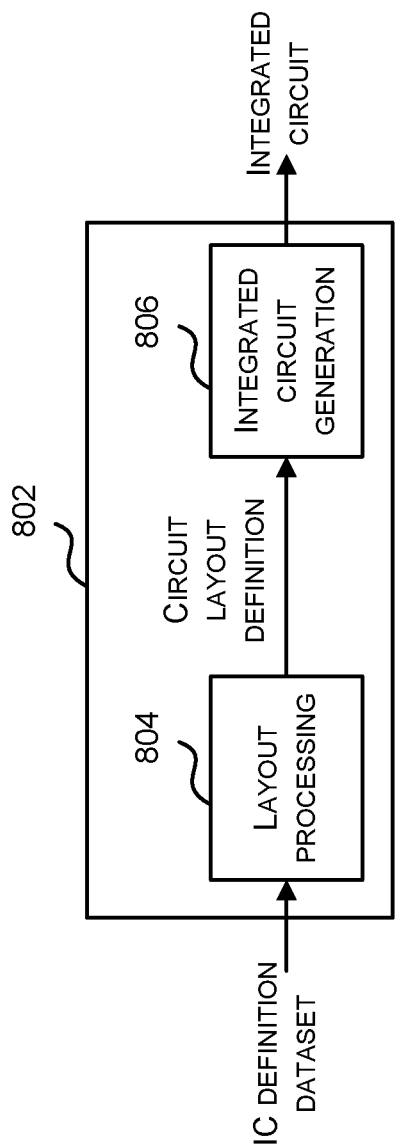
FIG. 8 shows an integrated circuit manufacturing system for generating an integrated circuit embodying a graphics processing pipeline comprising the edge test and/or depth calculation hardware described herein.

FIG. 8 shows an example of an integrated circuit (IC) manufacturing system 802 which is configured to manufacture a graphics processing pipeline comprising edge test and/or depth calculation hardware as described in any of the examples herein. In particular, the IC manufacturing system 802 comprises a layout processing system 804 and an integrated circuit generation system 806. The IC manufacturing system 802 is configured to receive an IC definition dataset (e.g. defining a graphics processing pipeline comprising edge test and/or depth calculation hardware as described in any of the examples herein), process the IC definition dataset, and generate an IC according to the IC definition dataset (e.g. which embodies a graphics processing pipeline comprising edge test and/or depth calculation hardware as described in any of the examples herein). The processing of the IC definition dataset configures the IC manufacturing system 802 to manufacture an integrated circuit embodying a graphics processing pipeline comprising edge test and/or depth calculation hardware as described in any of the examples herein.

The layout processing system 804 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 804 has determined the circuit layout it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 806 may be in the form of computer-readable code which the IC generation system 806 can use to form a suitable mask for use in generating an IC.

The different processes performed by the IC manufacturing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing pipeline comprising edge test and/or depth calculation hardware without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A graphics processing system arranged to render a scene in a rendering space, wherein the rendering space is sub-divided into a plurality of tiles, and each tile is sub-divided into a plurality of microtiles, each microtile comprising at least one pixel,
the graphics processing system comprising edge test and/or depth calculation hardware and wherein the edge test and/or depth calculation hardware comprises one or more hardware arrangements each arranged to perform an edge test or a depth calculation using a sum-of-products, each hardware arrangement comprising:
a microtile component hardware element comprising hardware logic arranged to calculate a first output using the sum-of-products and coordinates of a microtile within a tile in the rendering space;
a plurality of pixel component hardware elements, each comprising hardware logic arranged to calculate one of a plurality of second outputs using the sum-of-products and coordinates for different pixels defined relative to an origin of the microtile; and
a plurality of adders arranged to generate a plurality of output results for the sum-of-products in parallel by combining, for each output result, the first output and one of the plurality of second outputs, wherein the plurality of output results comprise edge test output values or depth calculation values
wherein the scene is rendered in said rendering space using the generated edge test output values or depth calculation values.

2. The graphics processing system according to claim 1, wherein one or more of the hardware arrangements further comprises:
a plurality of multiplexers arranged to select the different combinations of the first output and one of the plurality of second outputs.

3. The graphics processing system according to claim 1, wherein the plurality of adders comprise:
a plurality of addition and comparison elements, each addition and comparison element arranged to generate a different one of the plurality of output results by combining the first output and one of the plurality of second outputs.

4. The graphics processing system according to claim 1, wherein the plurality of adders comprises a first subset of the plurality of adders and a second subset of the plurality of adders,
wherein each of the pixel component hardware elements further comprises an input for receiving the first output from the microtile component hardware element and at least one of the first subset of the plurality of adders arranged to sum the first output received from the microtile component hardware element and the second output calculated by the pixel component hardware element to generate an intermediate result, and
wherein the second subset of the plurality of adders comprises:
a plurality of addition and comparison elements, each addition and comparison element arranged to generate a different one of the plurality of output results by summing a different combination of the intermediate results.

5. The graphics processing system according to claim 4, wherein one or more of the hardware arrangements further comprises a first plurality of multiplexers, each of the multiplexers in the first plurality of multiplexers having a plurality of inputs and an output, wherein each input is arranged to receive a different one of the intermediate results from the plurality of pixel component hardware elements and the multiplexer is arranged to select one of the received intermediate results and output the selected intermediate result to one of the plurality of addition and comparison elements via the output.

6. The graphics processing system according to claim 1, wherein the edge test and/or depth calculation hardware comprises at least one hardware arrangement arranged to perform an edge test, wherein the sum-of-products corresponds to an edge vector of a primitive.

7. The graphics processing system according to claim 6, wherein the edge test and/or depth calculation hardware comprises a plurality of hardware arrangements arranged to perform an edge test, wherein the sum-of-products for each of the plurality of hardware arrangements corresponds to a different edge vector of a single primitive.

8. The graphics processing system according to claim 6, further comprising a decision unit, the decision unit comprising an input for receiving the first output from the microtile component hardware element and hardware logic arranged to determine whether a combination of a second output, when added to the first output, could result in an output result having a different sign to the first output, and in response to determining that the combination could not result in an output having a different sign to the first output, to output a most significant bit of the first output.

9. The graphics processing system according to claim 1, wherein the edge test and/or depth calculation hardware comprises at least one hardware arrangement arranged to perform a depth calculation, wherein the sum-of-products corresponds to a depth equation of a primitive.

10. The graphics processing system according to claim 1, wherein the edge test and/or depth calculation hardware comprises a hardware arrangement arranged to perform a depth calculation and a plurality of hardware arrangements arranged to perform an edge test, wherein the sum-of-products used in the hardware arrangement arranged to perform a depth calculation corresponds to a depth equation of a primitive, and the sum-of-products used in each of the hardware arrangements arranged to perform an edge test corresponds to a different edge vector of the primitive.

11. The graphics processing system according to claim 10, wherein the primitive comprises pairs of parallel edge vectors and the two hardware arrangements arranged to perform edge tests corresponding to each of a pair of parallel edge vectors comprise shared pixel component hardware elements, such that the second outputs are each calculated once for each pixel within a microtile and used by both hardware arrangements.

12. A method of calculating an edge test output value or a depth calculation value in a graphics processing system arranged to render a scene in a rendering space, wherein the rendering space is sub-divided into a plurality of tiles, and each tile is sub-divided into a plurality of microtiles, each microtile comprising at least one pixel, the method comprising:
   in a first hardware element, calculating a first output based on coordinates of a microtile within a tile;
   in each of a plurality of second hardware elements, calculating a second output based on coordinates of a pixel within a microtile;
   combining a first output with a second output to generate an edge test output value or a depth calculation value.

13. The method of claim 12, wherein a plurality of edge test output values or depth calculation values are generated in parallel by combining, in each of a plurality of addition and comparison elements, a different combination of the first output and one of the plurality of second outputs.

14. The method of claim 13, further comprising either:
   determining whether there are more possible combinations of the first output and a plurality of second outputs than addition and comparison elements; and
   in response to determining that there are more possible combinations of the first output, and a plurality of second outputs than addition and comparison elements, selecting a mode of operation with a reduced size of a microtile such that it comprises fewer pixels;
   or:
   determining whether there are more possible combinations of the first output and a plurality of second outputs than addition and comparison elements; and
   in response to determining that there are more possible combinations of the first output and a plurality of second outputs than addition and comparison elements, generating an edge test output value or depth calculation value from each of a first subset of the possible combinations in a first clock cycle and generating an edge test output value or depth calculation value from each of a second subset of the possible combinations in a second clock cycle, wherein the first and second subsets are non-overlapping.

15. A non-transitory computer readable storage medium having stored thereon a computer readable description of an integrated circuit that, when processed in an integrated circuit manufacturing system, causes the integrated circuit manufacturing system to manufacture a graphics processing system arranged to render a scene in a rendering space, wherein the rendering space is sub-divided into a plurality of tiles, and each tile is sub-divided into a plurality of microtiles, each microtile comprising at least one pixel,
   the graphics processing system comprising edge test and/or depth calculation hardware and wherein the edge test and/or depth calculation hardware comprises one or more hardware arrangements each arranged to perform an edge test or a depth calculation using a sum-of-products, each hardware arrangement comprising:
   a microtile component hardware element comprising hardware logic arranged to calculate a first output using the sum-of-products and coordinates of a microtile within a tile in the rendering space;
   a plurality of pixel component hardware elements, each comprising hardware logic arranged to calculate one of a plurality of second outputs using the sum-of-products and coordinates for different pixels defined relative to an origin of the microtile; and
   a plurality of adders arranged to generate a plurality of output results for the sum-of-products in parallel by combining, for each output result, the first output and one of the plurality of second outputs, wherein the plurality of output results comprise edge test output values or depth calculation values.

* * * * *